(12) United States Patent
Olszewski

(10) Patent No.: US 6,431,986 B2
(45) Date of Patent: Aug. 13, 2002

(54) CONSTANT-VELOCITY UNIVERSAL JOINT OF A TRIPOD TYPE

(75) Inventor: Piotr Olszewski, Haguenau (FR)

(73) Assignee: Ina Wälzlager Schaeffer oHG, Herzogenaurach (DE)

( * ) Notice: Subject to any disclaimer, the term of this patent is extended or adjusted under 35 U.S.C. 154(b) by 0 days.

(21) Appl. No.: 09/772,343

(22) Filed: Jan. 30, 2001

Related U.S. Application Data

(63) Continuation of application No. PCT/EP99/05190, filed on Jul. 21, 1999.

(30) Foreign Application Priority Data

Jul. 31, 1998 (DE) .......................................... 198 34 513

(51) Int. Cl.$^7$ ................................................. F16D 3/34
(52) U.S. Cl. ...................... 464/111; 464/123; 384/564
(58) Field of Search ................................ 464/111, 120, 464/121, 122, 123, 124, 128, 129, 130, 132, 905; 384/559, 561, 564, 903

(56) References Cited

U.S. PATENT DOCUMENTS

| | | | | |
|---|---|---|---|---|
| 452,751 | A | * 5/1891 | Eveland | 384/564 |
| 1,469,991 | A | * 10/1923 | Armstrong | 384/564 |
| 2,236,481 | A | * 3/1941 | Storz | 384/561 X |
| 2,360,078 | A | * 10/1944 | Smith et al. | 384/561 |
| 4,604,077 | A | * 8/1986 | Orain | 464/111 |
| 5,080,502 | A | * 1/1992 | Diedrich | 384/564 |
| 5,376,049 | A | * 12/1994 | Welschof et al. | 464/123 X |
| 5,591,085 | A | 1/1997 | Stall et al. | |

FOREIGN PATENT DOCUMENTS

| | | |
|---|---|---|
| DE | 41 30 963 C2 | 4/1993 |
| DE | 43 31 474 C2 | 3/1995 |
| DE | 43 31 474 A | 3/1995 |
| DE | 44 29 479 C2 | 2/1996 |
| EP | 0 441 382 A | 8/1991 |
| EP | 0 532 992 A | 3/1993 |
| JP | 08338439 A | 12/1996 |

OTHER PUBLICATIONS

Machinery's Hanbook, 25th ed. New York, International Press, 1996. pp. 479–481. TJ 151.M3 1996.*

* cited by examiner

Primary Examiner—Greg Binda
(74) Attorney, Agent, or Firm—Henry M. Feiereisen

(57) ABSTRACT

A constant-velocity universal joint of a tripod type, includes a housing representing a first rotation part and having three tracks, each track having two flat running surfaces in parallel relationship, a second rotation part configured as a tripod spider and having three arms defined by arm axes arranged in a plane and intersecting in a joint axis. The arms are guided in the running surfaces of the housing, wherein each of the arms is received in a rolling-contact bearing including an inner ring, an outer ring, cylindrical rolling elements, and retainer rings arranged as mirror images of one another for mutual axial securement of all components of the rolling-contact bearing with respect to the arm axis. The outer ring includes inner collars which are arranged as mirror images of one another, each inner collar configured with two radial steps to define an axially inner collar segment and an axially outer collar segment, with the rolling elements guided on the inner collar segment and with the retainer rings guided on the outer collar segment.

40 Claims, 3 Drawing Sheets

CONSTANT-VELOCITY UNIVERSAL JOINT OF A TRIPOD TYPE

CROSS-REFERENCES TO RELATED APPLICATIONS

This application is a continuation of prior filed copending PCT International application no. PCT/EP99/05190, filed Jul. 21, 1999.

This application claims the priority of German Patent Application Serial No. 198 34 513.5, filed Jul. 31, 1998, the subject matter of which is incorporated herein by reference.

BACKGROUND OF THE INVENTION

The present invention relates, in general, to tripod type constant-velocity universal joint.

Typically, a constant-velocity universal joint of a tripod type has a housing as first rotation part which is provided with three tracks, each including two running surfaces in parallel relationship, and a second rotation part in the form of a tripod spider. The second rotation part includes three arms defining axes arranged in a plane and intersecting in a joint axis. The arms are guided by rolling-contact bearings in the running surfaces of the tracks for angular movement and displacement. Each arm is assigned to a rolling-contact bearing which includes an inner ring and outer ring for guiding cylindrically shaped rolling elements therebetween. A mutual securement of the components and a captivated unitary structure of the rolling-contact bearing are implemented by providing retainer rings.

Constant-velocity universal joint of the tripod type is oftentimes used in driveshafts of driven front wheels of motor vehicles. A typical example of a tripod joint is disclosed in German Pat. No. 43 31 474 and includes a rolling-contact bearing provided with an axial securement for all components thereof. In one variation, the rolling-contact bearing has an outer ring of asymmetric configuration with one-sided collar as axial stop for the rolling elements. Axially offset to the axial stop for the rolling elements, the radially inwardly directed collar is formed with an annular groove for placement of a retainer ring. On the inside, the retainer ring is fixed in a circumferential groove formed in the inner ring of the rolling-contact bearing and aligned with the radial groove. A further axial stop for the rolling elements is effected by providing the outer ring with a securing ring which is placed in an annular groove of the outer ring and extends on the inside toward the peripheral surface of the inner ring of the rolling-contact bearing while maintaining on the inside an annular gap. This conventional configuration of the rolling-contact bearing requires a precise positional assembly as a consequence of the asymmetric configuration of the outer ring.

German Pat. No. 44 29 479 C2 discloses a tripod-type constant-velocity universal joint in which a mutual, axial securement of all components of the rolling-contact bearing, arranged on arms, is realized by providing retainer rings which are placed in annular grooves of the outer rings of the rolling-contact bearing. Each of these retainer rings has on the outside the outer contour of the inner ring, whereby the retainer rings provide an axial stop for the rolling elements as well as for the inner ring, with these components directly supported upon the retainer ring. As a consequence of the common support upon the retainer ring, the latter is exposed to a higher transverse force and requires stronger dimensioning. A respectively reinforced and thus stiff retainer ring adversely affects, however, handling.

It would therefore be desirable and advantageous to provide an improved constant-velocity universal joint of the tripod type, which obviates prior art shortcomings and effects an axial securement for all components of the rolling-contact bearing, while yet allowing simple handling and cost-efficient fabrication of retainer rings.

SUMMARY OF THE INVENTION

The present invention provides for a constant-velocity universal joint of a tripod type, which includes a housing representing a first rotation part and having three tracks, each track having two flat running surfaces in parallel relationship, a second rotation part configured as a tripod spider and having three arms defined by arm axes arranged in a plane and intersecting in a joint axis, wherein the arms are guided in the running surfaces of the housing, with each of the arms received in a rolling-contact bearing including an inner ring, an outer ring, cylindrical rolling elements, and retainer rings arranged as mirror images of one another for mutual axial securement of all components of the rolling-contact bearing with respect to the arm axis, wherein the outer ring includes inner collars which are arranged as mirror images of one another, each inner collar configured with two radial steps to define an axially inner collar segment and an axially outer collar segment, with the rolling elements guided on the inner collar segment and with the retainer rings guided on the outer collar segment.

The novel and inventive configuration according to the present invention results in a desired, separate axial guidance between the rolling elements and the retainer rings, so that these components are prevented from influencing each other, i.e. the inner collar segment of the outer ring, forming an axial stop, and the retainer rings absorb only transverse forces from the component that is associated thereto. Thus, the retainer rings can be of lighter configuration as prior art constructions, i.e. the required wall width of the retainer rings can be reduced. Moreover, the retainer rings may have a smaller diameter as they do not overlap the structural height of the rolling elements but are guided at the radially inwardly offset step of the outer ring. The retainer rings can thus be manufactured at lower costs and can be better handled as the decreased stiffness facilitates the assembly.

In accordance with the present invention, the axial guidance for the rolling elements and the axial guidance for the inner ring of the rolling-contact bearing are clearly separated from one another. At the same time, a simplified assembly of the retainer rings is established which have smaller dimensions, i.e. a smaller outer diameter, as well as reduced wall width. In addition, the novel and inventive rolling-contact bearing allows the use of rolling elements of a width which is the same as in prior art constructions.

According to another feature of the present invention, the axial distance between the first radial step and the second radial step is so selected as to exceed the wall width of the retainer rings. This stepped configuration allows the use of an inner ring of a width which exceeds a length of the rolling elements, thereby ensuring that the rolling elements are supported and guided over the entire length on the outer surface of the inner ring.

A simplified installation of the retainer rings in the outer ring of the rolling-contact bearing is implemented when providing the retainer rings with a parting line. Hereby, the parting line can have a width which is independent from the diameter of the rolling elements. A great line width considerably simplifies the installation as a result of the simplification of the required radial compression of the retainer rings during installation, so that handling and installation of the retainer rings are improved. As the retainer rings are provided solely for support and guidance of the inner ring of the rolling-contact bearing, the width of the parting line can be dimensioned solely on considerations of simplifying the installation. Unlike in conventional constructions, there is no need to suit the width of the parting line of the retainer rings to the diameter of the rolling elements. As a consequence, there is no need for a preferred disposition of the parting line, i.e. the parting line may be formed radially in the retainer ring or oblique with respect to a radial extension.

Suitably, the outer ring of the rolling-contact bearing is provided in immediate proximity of the area of the first radial step, i.e. at the end of the track for the rolling elements, with a circumferential undercut for providing a relief, i.e. prevention of stress peaks introduced by the ends of the rolling elements into the tracks of the outer rings. The undercut is so positioned and configured as to correspond with the free end of the rolling element.

To effect a certain degree of freedom, the retainer rings are installed at a distance to the confronting end faces of the inner ring. This axial play enables an alignment between the components of the rolling-contact bearing at installation and prevents disadvantageous warping.

It may also be suitable to provide an overlap between the inner diameter of the retainer rings and the outer diameter of the inner ring, whereby a sufficient positional securement of the inner ring is established when the overlap is dimensioned to correspond to or exceed half a wall width of the retainer rings.

The axial outer collar segment of the outer ring of the rolling-contact bearing may be configured to correspond to or exceed half a wall width of the retainer rings.

According to another feature of the present invention, the outer ring of the rolling-contact bearing may have different outer profile. For example, the outer ring may have a rounded, substantially semicircular outer profile. It may also be possible to configure the outer ring with a cylindrical outer profile with a radially stepped, cylindrical portion, whereby the radially projecting cylindrical portion may be disposed in symmetry or optionally in offset relationship to the center of the outer ring. Another construction of the outer ring may include a configuration resembling a pointed roof.

BRIEF DESCRIPTION OF THE DRAWING

Other features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
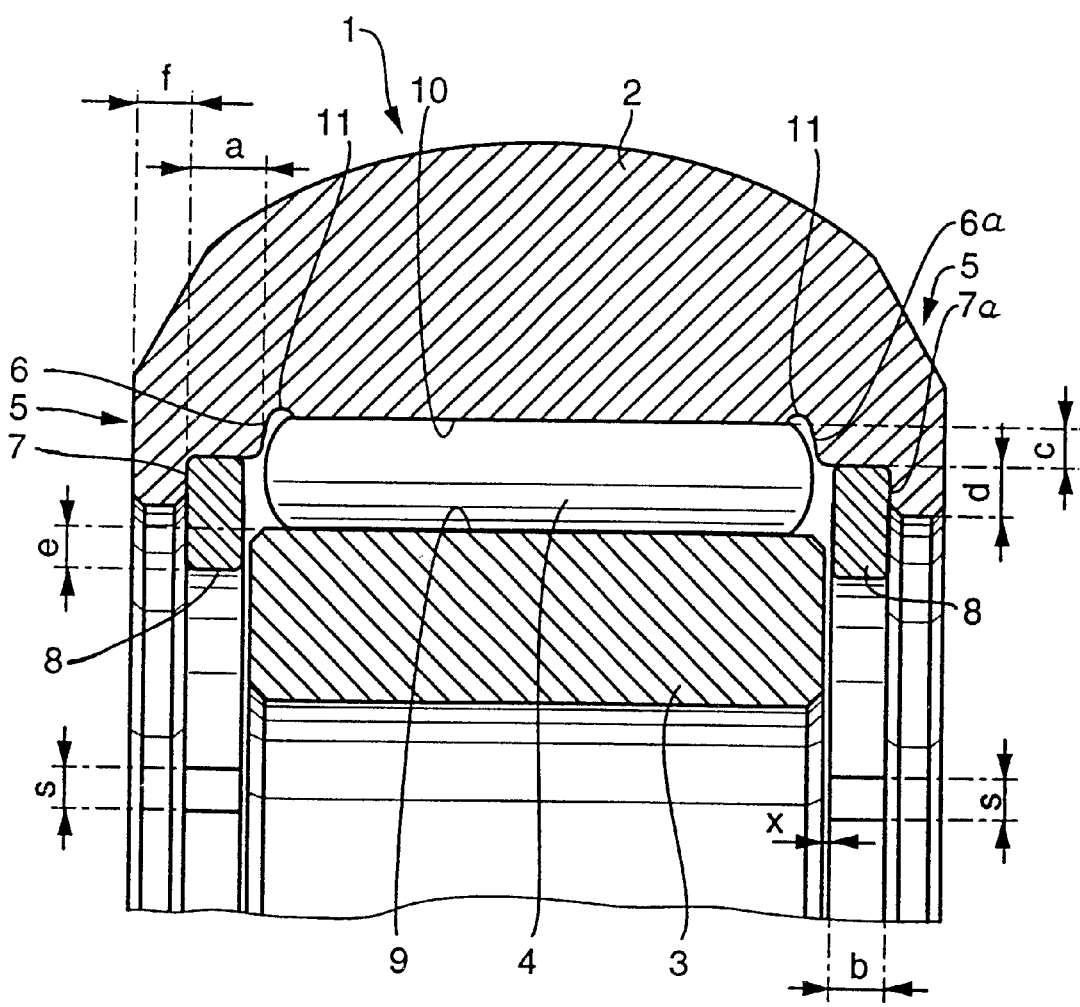
FIG. 1 is a sectional view of half a rolling-contact bearing according to the present invention for use in a tripod-type constant-velocity universal joint.

Throughout all the Figures, same or corresponding elements are generally indicated by same reference numerals.

Turning now to the drawing, and in particular to FIG. 1, there is shown a half sectional view of a rolling-contact bearing according to the present invention, generally designated by reference numeral 1 and configured for use in a tripod-type constant-velocity universal joint, generally designated by reference numeral 12 and described in more detail hereinafter with reference to FIG. 2. The rolling-contact bearing 1 includes an outer ring 2 and an inner ring 3, which is surrounded in concentric relationship by the outer ring 2. Disposed between the outer ring 2 and the inner ring 3 are rolling elements 4 configured as cylindrical needles and supported on tracks 10 of the outer ring 2. At each of both end faces of the rolling elements 4, the outer ring 2 is formed with a double-stepped collar, generally designated by reference numeral 5.

As the opposite sides of the rolling-contact bearing 1 are mirror images of one another and thus of an identical construction, it will be understood by persons skilled in the art that in the following a description of one side is equally applicable to the other side.

The collar 5 has an axially inner collar segment 6 which defines a first step and has an axial end face 6a for providing a stop for the rolling elements 5. At an axial distance to the collar segment 6, the collar 5 has a radially inwardly offset collar segment 7 which has an axial end face 7a for guiding a retainer ring 8, positioned at a distance x to the confronting end face of the inner ring 3, when installed. The term "radially inward" will denote a direction toward a center axis B (FIG. 2) of the rolling-contact bearing 1, while the term "axial" will denote a direction defined by the longitudinal axis of the rolling element 4. The inner collar segment 6 has a width denoted "a" which exceeds a width denoted "f" of the outer collar segment 7, whereby the width "a" of the inner collar segment 6 is equal or greater than half a wall width "b" of the retainer ring 8. The end face 6a of the collar segment 6 is thus spaced from the end face 7a of the outer collar segment 7 at a distance commensurate with the width "a" which also exceeds the wall width "b" of the retainer ring 8. Therefore, the inner ring 3 can be made wider than the length of the rolling elements 4, so that the rolling elements 4 are supported over their entire length by the outer surface 9 of the inner ring 3.

A pressure relief or prevention of an inadmissible high stress upon the track 10 for the rolling elements 4 in the outer ring 2 can be implemented by forming undercuts 11, also called relief grooves, in the track 10 of the outer ring 2 in the area of the end faces of the rolling elements 4. Through formation of the undercuts 11, the tracks 10 can be made in a dimensionally precise manner through grinding.

The collar segment 6 has a radial overlap, denoted "c" with respect to the rolling elements 4, whereby the overlap "c" is equal or smaller than half a diameter of the rolling elements 4. The collar segment 7 has a radial overlap, denoted "d", with respect to the outer contour of the retainer ring 8, ring 8. A further radial overlap, denoted "e", is established between the inner contour of the retainer ring 8 and the confronting outer contour of the inner ring 3, whereby the overlap "e" is equal or greater than half the wall width "b" of the retainer ring 8.

Each retainer ring 8 has a parting line, denoted "S", which permits the installation of the retainer ring 8 in the outer ring 2. At assembly, the retainer ring 8 is radially pre-stressed to such an extent as to be able to bridge the inner diameter of the outer ring 2, as governed by the collar segment 7. Hereby the extent of the parting line "S" can be randomly determined, i.e. without consideration of the diameter of the rolling element 4 as the retainer ring 8 does not contribute to the guidance of the rolling elements 4.

Figure 2:
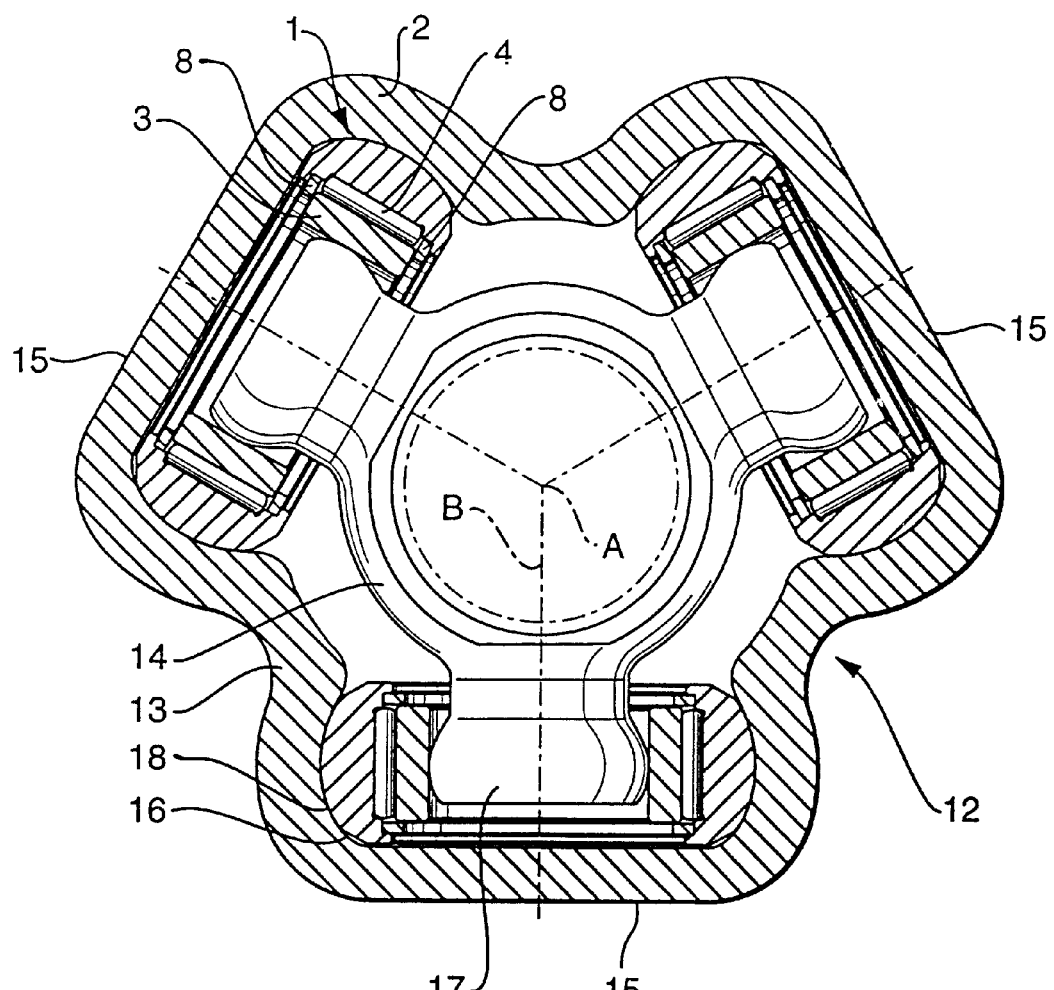
FIG. 2 is an illustration of a tripod-type constant-velocity universal joint in cross section relative to the joint axis.
Figure 3:
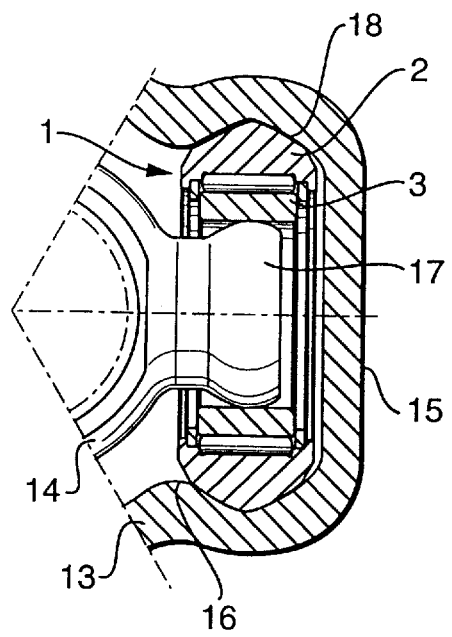
FIG. 3 is a detailed cross sectional view of a variation of an outer ring for use in the rolling-contact bearing.

FIG. 2 shows the tripod-type constant-velocity universal joint 12 in cross section with respect to the joint axis A. The tripod joint 12 includes a housing 13 forming an outer rotating joint element, and an inner rotating joint element 14 in the form of a tripod spider 14 having three arms 17 which are arranged in a star-like manner. Each arm 17 is defined by center axis B, whereby the center axes B of the arms 17 are oriented in a plane and intersect in the longitudinal joint axis A. The housing 13 includes three track-forming pockets 15 for receiving rolling-contact bearings 1 according to FIG. 1. Each pocket 15 forms two opposite running surfaces 16 in parallel relationship. The arms 17 are aligned radially to the longitudinal joint axis A and form at each of their free ends a spherical head type receptacle for guiding an inner ring 3 of the rolling-contact bearing 1. The outer contour of the outer ring 2 of the rolling-contact bearing 1 is guided by the running surfaces 16 of the housing 3. In the non-limiting example of FIG. 2, the outer ring 2 has an outer profile 18 which is matched to the configuration of the running surfaces 16.

Figure 4:
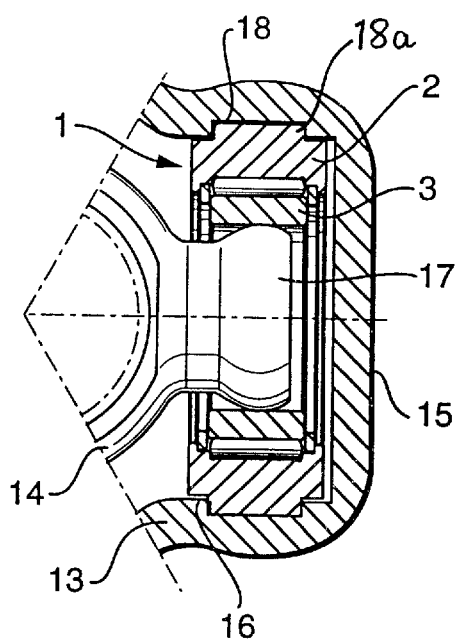
FIG. 4 is a detailed cross sectional view of another variation of an outer ring for use in the rolling-contact bearing.
Figure 5:
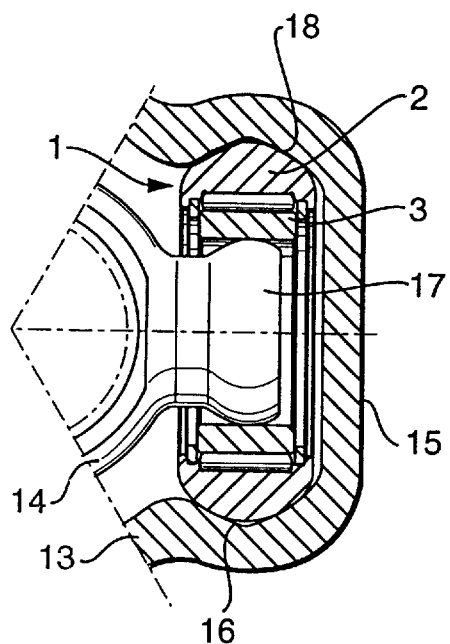
FIG. 5 is a detailed cross sectional view of still another variation of an outer ring for use in the rolling-contact bearing.
Figure 6:
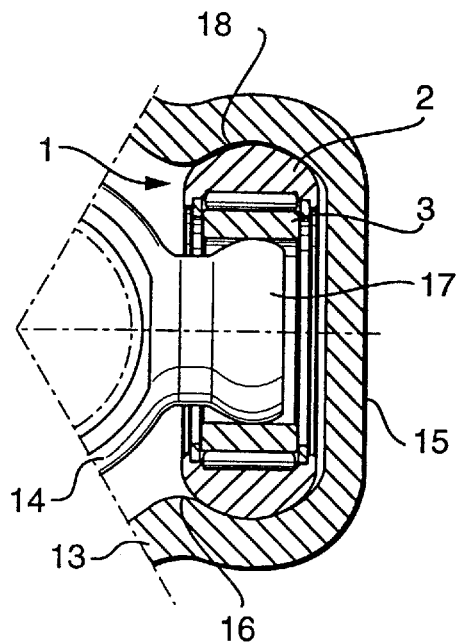
FIG. 6 is a detailed cross sectional view of the outer ring as used in the rolling-contact bearing for the tripod-type constant-velocity universal joint of FIG. 2.

FIGS. 3 to 6 show detailed views of different geometric configuration of the outer profile 18 of the outer ring 2 for cooperation with the running surfaces 16 in the housing 13. The outer profile 18 of the outer ring 2 shown in FIG. 3 has a substantially roof-shaped configuration for interaction with complementarily shaped configuration of the running surfaces 16. In FIG. 4, the outer profile 18 of the outer ring 2 has a radially stepped cylindrical configuration, with the running surfaces 16 formed with complementary grooves for engagement of a central, cylindrical projection 18a of the outer ring 2. In FIG. 5, the outer profile 18 of the outer ring 2 has a substantially roof-shaped configuration for guidance in the housing 13 along running surfaces 16 which have a radius that deviates from the radius of the semicircular outer profile 18. The outer profile 18 of the outer ring 2 according to FIG. 6 has also of a semi-round configuration, with the difference to the configuration in FIG. 5 residing in the configuration of the running surfaces 16 of the housing 13 which complement here the semi-round shape of the outer profile 18.

While the invention has been illustrated and described as embodied in a constant-velocity universal joint of a tripod type, it is not intended to be limited to the details shown since various modifications and structural changes may be made without departing in any way from the spirit of the present invention.

What is claimed as new and desired to be protected by letters Patent is set forth in the appended claims:

What is claimed is:

1. A constant-velocity universal joint of a tripod type, comprising:
   a housing representing a first rotation part and having three tracks, each track having two running surfaces in parallel relationship; and
   a second rotation part configured as a tripod spider and having three arms defined by arm axes arranged in a plane and intersecting in a joint axis, said arms guided in the running surfaces of the housing, each of the arms being received in a rolling-contact bearing including an inner ring, an outer ring, cylindrical rolling elements, and retainer rings arranged as mirror images of one another for mutual axial securement of the inner and outer rings and rolling elements of the rolling-contact bearing with respect to the arm axis, wherein the outer ring includes inner collars which are arranged as mirror images of one another, each of said inner collars configured with two radial steps to define an axially inner collar segment and an axially outer collar segment, with the rolling elements guided on the inner collar segment and with the retainer rings guided on the outer collar segment.

2. The universal joint of claim 1, wherein the roller elements define an axis of symmetry, said inner collar segment extending in a radial direction to an area near the axis of symmetry.

3. The universal joint of claim 1, wherein the outer collar segment has an inner end face for guiding the retainer rings, wherein the end face of the outer collar segment is spaced from an inner end face of the inner collar segment by a distance which is greater than a wall width of the retainer rings.

4. The universal joint of claim 1, wherein the inner ring has a length which is greater than a length of the rolling elements.

5. The universal joint of claim 1, wherein the retainer rings have a parting line.

6. The universal joint of claim 5, wherein the parting line of the retainer rings extends in radial alignment to the arm axis.

7. The universal joint of claim 1, wherein the outer ring is formed with an undercut in correspondence with an end face of the rolling element directly inwards of the inner collar segment.

8. The universal joint of claim 1, wherein the retainer rings are arranged at a distance to confronting end faces of the inner ring.

9. The universal joint of claim 1, wherein the retainer rings are so arranged the end faces of the inner ring by a size which is equal or greater than a wall width of the retainer rings.

10. The universal joint of claim 1, wherein the outer collar segment has a width which is equal or greater than half a wall width of the retainer rings.

11. The universal joint of claim 1, wherein the outer ring has a round outer profile.

12. The universal joint of claim 1, wherein the outer ring has a radially stepped, cylindrical outer profile.

13. The universal joint of claim 1, wherein the outer ring has an annular, substantially pointed roof-like outer profile.

14. The universal joint of claim 1, wherein the running surfaces of each track are flat.

15. A constant-velocity universal joint of a tripod type, comprising:
    an outer joint part having pockets;
    an inner joint part having arms extending in a star-shaped configuration and guided in the pockets of the outer joint part, said arms defining axes intersecting in a common joint axis;
    a plurality of rolling-contact bearings for supporting the arms, whereby the bearings and the arms are placed into one-to-one correspondence, each of the bearings including an inner ring, an outer ring, cylindrical rolling elements placed between the inner and outer rings, and an opposite pair of retainer rings for securement of the inner and outer rings relative to one another, said outer ring having opposite end faces which are each configured with a double-stepped collar to define an axially inner collar segment for guiding the rolling elements and an axially outer collar segment for guiding the retainer rings.

16. The universal joint of claim 15, wherein the outer collar segment has an inner end face for guiding the retainer rings, wherein the end face of the outer collar segment is spaced from an inner end face of the inner collar segment by a distance which is greater than a wall width of the retainer rings.

17. The universal joint of claim 15, wherein the inner ring has a length which is greater than a length of the rolling elements.

18. The universal joint of claim 15, wherein the retainer rings have a parting line.

19. The universal joint of claim 18, wherein the parting line of the retainer rings extends in radial alignment to the arm axis.

20. The universal joint of claim 15, wherein the outer ring is formed with an undercut in correspondence with an end face of the rolling element directly inwards of the inner collar segment.

21. The universal joint of claim 15, wherein the retainer rings are arranged at a distance to confronting end faces of the inner ring.

22. The universal joint of claim 15, wherein the retainer rings are so arranged on opposite end faces of the inner ring as to overlap an outer diameter of the inner ring by a size which is equal or greater than a wall width of the retainer rings.

23. The universal joint of claim 15, wherein the outer collar segment has a width which is equal or greater than half a wall width of the retainer rings.

24. The universal joint of claim 15, wherein the outer ring has a round outer profile.

25. The universal joint of claim 15, wherein the outer ring has a radially stepped, cylindrical outer profile.

26. The universal joint of claim 15, wherein the outer ring has an annular, substantially pointed roof-like outer profile.

27. The universal joint of claim 15, wherein the roller elements define an axis of symmetry, said inner collar segment extending in a radial direction to an area near the axis of symmetry.

28. A rolling-contact bearing arrangement for supporting arms of a constant-velocity universal joint of a tripod type, said bearing arrangement comprising a rolling-contact bearing including an inner ring, an outer ring, cylindrical rolling elements placed between the inner and outer rings, and an opposite pair of retainer rings for securement of the inner and outer rings, said outer ring having opposite end faces which are each configured with a double-stepped collar to define an axially inner collar segment for guiding the rolling elements and an axially outer collar segment for guiding the retainer rings.

29. The bearing arrangement of claim 28, wherein the outer collar segment has an inner end face for guiding the retainer rings, wherein the end face of the outer collar segment is spaced from an inner end face of the inner collar segment by a distance which is greater than a wall width of the retainer rings.

30. The bearing arrangement of claim 28, wherein the inner ring has a length which is greater than a length of the rolling elements.

31. The bearing arrangement of claim 28, wherein the retainer rings have a parting line.

32. The bearing arrangement of claim 31, wherein the parting line of the retainer rings extends in radial alignment to an arm axis.

33. The bearing arrangement of claim 28, wherein the outer ring is formed with an undercut in correspondence with an end face of the rolling element directly inwards of the inner collar segment.

34. The bearing arrangement of claim 28, wherein the retainer rings are arranged at a distance to confronting end faces of the inner ring.

35. The bearing arrangement of claim 28, wherein the retainer rings are so arranged on opposite end faces of the inner ring as to overlap an outer diameter of the inner ring by a size which is equal or greater than a wall width of the retainer rings.

36. The bearing arrangement of claim 28, wherein the outer collar segment has a width which is equal or greater than half a wall width of the retainer rings.

37. The bearing arrangement of claim 28, wherein the outer ring has a round outer profile.

38. The bearing arrangement of claim 28, wherein the outer ring has a radially stepped, cylindrical outer profile.

39. The bearing arrangement of claim 28, wherein the outer ring has an annular, substantially pointed roof-like outer profile.

40. The bearing arrangement of claim 28, wherein the roller elements define an axis of symmetry, said inner collar segment extending in a radial direction to an area near the axis of symmetry.

* * * * *